United States Patent

Wittman

[15] 3,662,116

[45] May 9, 1972

[54] SUBSCRIBER SUPERIMPOSED SIGNALING UNIT

[72] Inventor: John Philip Wittman, Raleigh, N.C.

[73] Assignee: International Telephone and Telegraph Corporation, New York, N.Y.

[22] Filed: Oct. 2, 1970

[21] Appl. No.: 77,603

[52] U.S. Cl. ................................179/17 E, 179/86, 179/2.5

[51] Int. Cl. ..........................................................H04m 3/56

[58] Field of Search ...................................179/17 E, 86, 2.5

[56] References Cited

UNITED STATES PATENTS 3,051,792 8/1962 Dahlman ..............................179/17 E 1,710,934 4/1929 Lomax ................................179/17 E

*Primary Examiner*—Kathleen H. Claffy
*Assistant Examiner*—Tom D'Amico
*Attorney*—C. Cornell Remsen, Jr., Walter J. Baum, Paul W. Hemminger, Charles L. Johnson, Jr., James B. Raden and Marvin M. Chaban

[57] ABSTRACT

Ringing control tone is provided to operate the ringing circuit of any one of a plurality of party line subscribers. Ringing depends upon operation of control relays which direct signals with a superimposed dc of one or the other polarity on the tip or ring side of the called subscriber's line. The control relays are locked in position on operation of the relay which provides ring tone. In this way "bell tap," or "cross ringing," is prevented.

5 Claims, 2 Drawing Figures

INVENTOR
John P. Wittman
BY Delbert A. Warner
ATTY.

INVENTOR
John P. Wittman

BY Delbert P. Warner
ATTY.

SUBSCRIBER SUPERIMPOSED SIGNALING UNIT

The present invention relates to the provision of multiple party line service with superimposed ringing. It has particular utility with four-party lines.

In providing ringing signals privately to four subscribers on the same party line it is known to supply plus or minus signals on the tip or ring side of each party line to enable four distinct voltage levels to be supplied. The bells in the four party receivers are each selected to respond only to one of these four signals. However, if performance of the equipment becomes marginal, the ringing signal being transmitted to a particular party may range outside a critical level causing a bell in one of the other party lines to respond with a sound commonly called "bell tap." This sound is generally regarded as undesirable in party lines, since it is annoying to the person hearing it while at the same time it deprives the person being rung of a measure of privacy.

It is a primary object of the present invention to provide a circuit which will assure that ringing signals of the required polarity and amplitude are supplied to each party on a party line.

It is a further object of this invention to provide positive locking means to assure that one party, and only one party, of a multi-party line receives a ringing signal at one time.

The foregoing objects and others ancillary thereto are accomplished by employing ring control means, polarity control means and tip-ring control means connected in series between a ringing tone generator and the tip and ring lines of a called line. Control signals from a central office are used to control each of these means and apply ring current tone of one polarity or the other respectively either to the tip or ring sides of a line. In this way, each of four parties on the line may be signalled separately. In order to prevent "bell-tap" due to a change in signals from either the polarity control means or the tip-ring control means while one of the parties is being rung, a separate lock up is provided to prevent the polarity control and tip-ring control from changing while ringing current is being applied.

Figure 1:
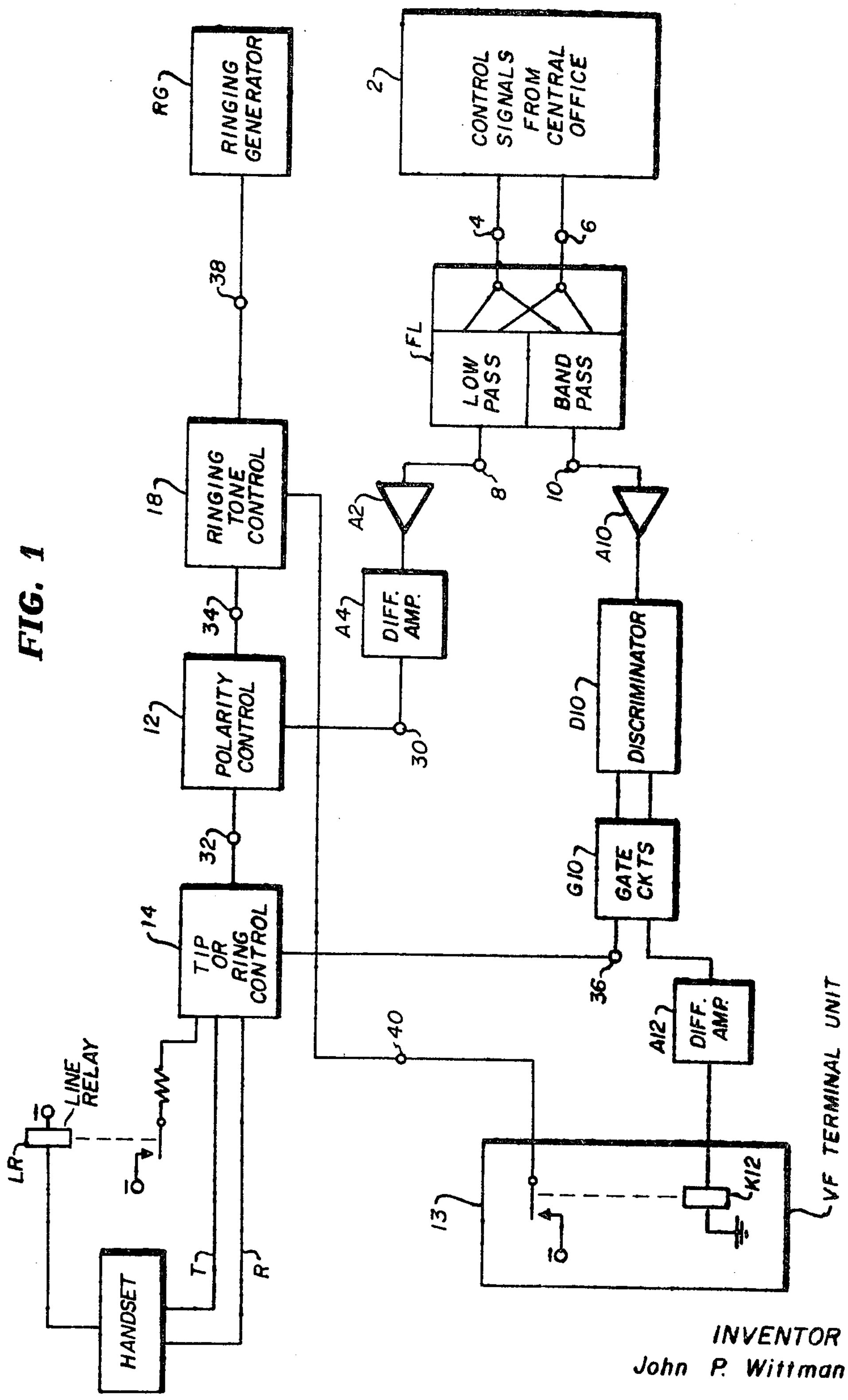
Figure 2:
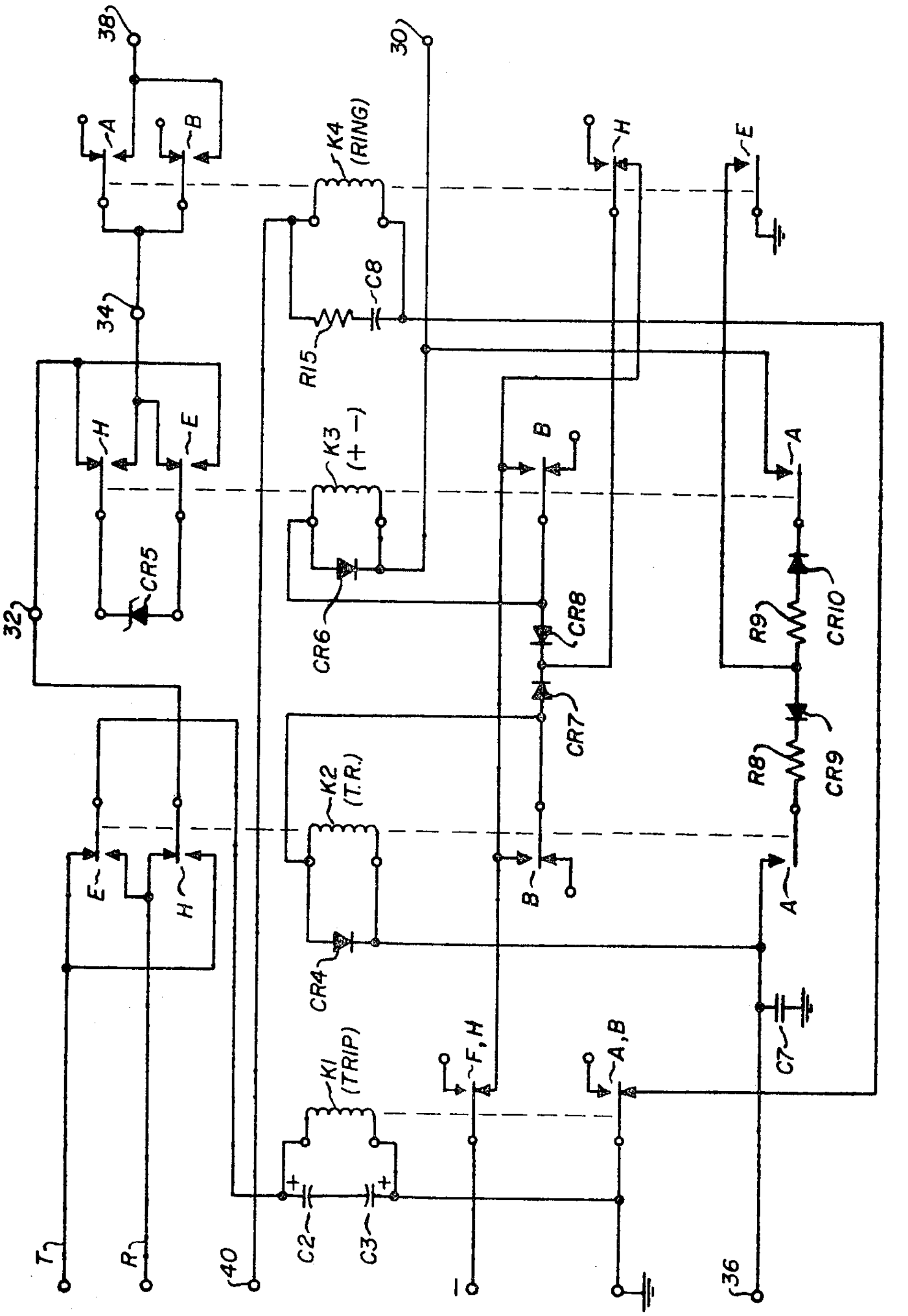

The above mentioned and other features and objects of this invention and the manner of obtaining them will become more apparent, and the invention itself will be best understood by reference to the following description of an embodiment of the invention taken in conjunction with the accompanying drawings, in which:

FIG. 1 is a block diagram of use in illustrating the general principles of the invention, and FIG. 2 shows further details of ring control circuits important to the invention.

For use in a telephone system compatible with the present invention, ringing signal is supplied by the central office from a ring generator. A signal at the frequency of a first tone (3.7 kHz) is supplied for use in controlling the connection to tip or ring lines of a party being called. A second tone (2.7 kHz) is provided for use in controlling the polarity of the superimposed dc on the ringing signal.

The control of polarity of the superimposed dc on the ring signal and the control of connections between tip or ring enable four ringing conditions to be applied to one pair of lines and ground and thus enable four parties to be rung individually on the same two-wire line.

Turning to FIG. 1, a ringing generator is indicated at RG. Typically, a 20 Hertz signal of typically 130 volts rms will be provided by this generator. The block 2 indicates the source of signals used in controlling ringing. This equipment is located at a subscriber carrier terminal and involves components outside the scope of the present invention. The signals from block 2 may be designated as the control signals and are provided typically at three frequencies of 2.7 kHz, 3.7 kHz and 3.9 kHz in the K24 system. Other means and tones may be used by other systems. The control signals are applied over terminals 4 and 6 to a filter unit FL2 which incorporates low pass and band pass filters, as indicated.

The output of the low pass filter at 2.7 kHz is applied over terminal 8 and through amplifiers at A2 and A4 via terminal 30 to a polarity control unit at 12. This polarity control unit regulates the polarity of the ringing signal by subtracting potential from the positive or negative half-cycles respectively of the ringing peak voltage supplied by the generator RG.

The outputs of the band pass filter on terminal 10 are provided at 3.7 and 3.9 kilo-Hertz. These signals are applied over the amplifier A10 to a discriminator circuit at D10. The discriminator drives gate circuits indicated by the block at G10. The gate circuits supply the 3.7 kHz signals over terminal 36 to operate the Tip-Ring control component indicated at 14. This control component determines whether the ringing signal will be applied to the tip T or the ring R side of the two wire line. This control, together with the polarity control, assures means for supplying four distinct signal states over the two-wire line enabling transmission of distinct signals to four parties.

When ringing is called for by the central office, the 3.7 kilo-Hertz and 3.9 kilo-Hertz signals are interrupted at a 20 Hertz rate. This causes an output of the gate circuits G10 to be applied to the differential amplifier A12. This amplifier A12 is energized and pulls the drop relay K12 in a voice frequency terminal unit at 13, causing the ringing tone control at 18 to be operated to supply ringing current from the ringing generator RG to the polarity control device 12, at terminal 34.

Referring to FIG. 2 for further details, it will be seen that polarity of the ringing signal is determined in accordance with which pair of contacts of a relay K3 are closed while the ring relay K4 is operated. The contacts of K3 are opened or closed according to the presence or absence of a 2.7 kHz tone at the terminal 30. If the 2.7 kHz tone is present at terminal 30, the relay K3 will be pulled "in" to pole the zener diode (CR5) to subtract 80 volts from the positive half cycle of the common ringer peak voltage yielding an equivalent of about −40 volt superimposed dc voltage at the terminal 32. When no 2.7 kHz tone is present at terminal 30 the relay K3 will be relaxed with contacts closed as shown in the drawing so that the zener diode subtracts 80 volts from the negative peak voltage of the common ringer resulting in an equivalent of about +40 volt superimposed dc at terminal 32.

In FIG. 2, when the 3.7 kHz signal used in operating the Tip or Ring control unit is available on the terminal 36, the relay K2 is operated to connect the ringing circuit to the tip side T of the line. The capacitor C7 is charged and maintains the relay K2 pulled "in" when the 3.7 kHz tone is interrupted at the 20 Hertz ringing rate. When either no tone is present or 3.9 kHz is present, the gate G10 supplies no output at terminal 36, K2 is not operated, and the ringing circuit is tied to the ring side R of the line.

RELAY INTERLOCK FEATURE

As has been discussed previously, a common problem with superimposed subscriber ringing is that if the tip-ring select or plus-minus select relays change position during the ringing period, bell tap or cross ringing results. In units constructed in accordance with the present invention, the select relays (K2 and K3) shown in FIG. 2 are allowed to function in accordance with the dictates of their control signals as long as the ring relay (K4) is deenergized. However, the select relays are locked in whatever positions they have when K4 energizes and they are kept locked in those positions until K4 deenergizes.

Interlock is accomplished as follows. If a select relay is "on" when K4 is energized, a parallel holding circuit is formed through the "A" contacts of K2 or K3, a resistor R8 or R9 and a diode CR9 or CR10, and finally grounded through the "E" contacts of K4. When they turned "on", K2 or K3 found their supply voltage through CR7 or CR8 and the "H" contacts of K4. Once "on", a parallel path exists through their own "B" contacts after which the "H" contacts of K4 may open with no effect. Consequently, if K2 and/or K4 are "on" when K4 energizes they are locked "on" by a parallel control path through their "B" contacts and the E contact of K4 to ground. If "off", K2 or K3 have no turn-on path through K4's "H" contacts once K4 is energized. It follows, therefore, that neither K2 nor K3 may change state during the ring cycle.

RING-TRIP CIRCUIT

Ringing is prevented or terminated when the called subscriber telephone is off-hook. To provide this effect, a line relay LR (FIG. 1) places —48 VDC on the tip lead through a resistor, and —48 VDC through a resistor to the transmit keyer. The first voltage pulls in the trip relay, K1 (FIG. 2), which disables K4 through its A, B contacts and disables K2 and K3 through its F, H contacts thus completely inhibiting ringing when the subscriber is off-hook. At the same time the voltage applied to the transmit keyer cause 3.9 kHz to be sent to the central office which inhibits ringing from the CO by simulating the off-hook condition there. Thus ring-trip between ringing cycles or before ringing is accomplished.

If the subscriber goes off-hook during the ringing cycle, the ringing voltage itself finds a path through the telephone to the trip relay, which is always connected to the opposite side of the line from the ringing generator through the tip-ring select relay's (K2) contacts. The trip relay pulls in and conditions settle down as described in the above paragraph with DC holding in the trip relay (K1).

While the principles of the invention have been described above in connection with specific apparatus and applications, it is to be understood that this description is made only by way of example and not as a limitation on the scope of the invention.

I claim:

1. A signaling unit for use in multiple party line service comprising
a source of ringing signal,
a source of control signals,
first switching means responsive to a first control signal to operate means for regulating the polarity of said ringing signal,
second switching means responsive to a second control signal to operate means for applying the ringing signal to either the tip or the ring side of a party line, and
third switching means for coupling said ringing signal through said means for regulating polarity and through said means for applying the ringing signal to either the tip or ring side of a party line for use in signaling a party on the line,
said third switching means including switching elements to prevent changes in the switching condition of said first and second switching means while ringing signal is supplied to the called party.

2. A unit as claimed in claim 1, in which
the first switching means includes a relay, and
the means to control the polarity of said ringing signal includes a zener diode coupled through contacts of the relay to provide a sufficient change in voltage drop to establish the polarity changes.

3. A unit as claimed in claim 1, in which
the second switching means includes a relay and relay contacts for switching between tip and ring sides of a called party line.

4. A unit as claimed in claim 1, in which
the third switching means is a relay, and
the switching elements to prevent changes in the switching conditions of said first and second switching means includes relay contacts completing latching circuits for said first and second switching means.

5. A unit as claimed in claim 1, including
means for preventing ringing when the called subscriber telephone is off-hook,
said means including a line relay and a trip relay,
said line relay operating, when the subscriber telephone is off-hook, to close contact elements which divert operate potential to the trip relay,
said trip relay operating to open contact elements which disable the first, second and third switching means and thus inhibit ringing.

* * * * *